United States Patent
Ueda et al.

(10) Patent No.: US 6,864,016 B2
(45) Date of Patent: Mar. 8, 2005

(54) NON-AQUEOUS ELECTROLYTE SECONDARY BATTERY

(75) Inventors: Atsushi Ueda, Osaka (JP); Kumiko Sonoda, Hirakata (JP); Kazuya Iwamoto, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 59 days.

(21) Appl. No.: 10/333,104

(22) PCT Filed: Jun. 21, 2001

(86) PCT No.: PCT/JP01/05338

§ 371 (c)(1),
(2), (4) Date: Jan. 15, 2003

(87) PCT Pub. No.: WO02/07248

PCT Pub. Date: Jan. 24, 2002

(65) Prior Publication Data

US 2004/0013945 A1 Jan. 22, 2004

(30) Foreign Application Priority Data

Jul. 17, 2000 (JP) ........................................ 2000-215521

(51) Int. Cl.$^7$ ................................................. H01M 6/16
(52) U.S. Cl. ........................................ 429/188; 429/324
(58) Field of Search ................................ 429/332, 331, 429/333, 330, 338, 340, 199, 326, 325, 324, 231.1, 231.8, 188; 252/182.1

(56) References Cited

U.S. PATENT DOCUMENTS 6,479,191 B1    11/2002   Hamamoto et al.
2003/0148190 A1 * 8/2003  Hamamoto et al. ......... 429/326

FOREIGN PATENT DOCUMENTS

| CN | 13222027 A | 11/2001 |
|----|-----------|---------|
| JP | 05-326016 A | 12/1993 |
| JP | 10-189041 A | 7/1998 |
| JP | 10-270079 A | 10/1998 |
| JP | 11-162517 A | 6/1999 |
| JP | 2000-058118 A | 2/2000 |
| JP | 2001-133304 A | 5/2000 |
| JP | 2001-023684 A | 1/2001 |
| JP | 2001-043895 A | 2/2001 |
| JP | 2001-052738 A | 2/2001 |
| JP | 2001-052744 A | 2/2001 |
| JP | 2001-068154 A | 3/2001 |
| JP | 2001-167791 A | 6/2001 |

* cited by examiner

Primary Examiner—Raymond Alejandro
(74) Attorney, Agent, or Firm—Akin Gump Strauss Hauer & Feld, LLP

(57) ABSTRACT

In order to suppress deterioration in battery characteristics of a non-aqueous electrolyte secondary battery at a high temperature and to reduce the amount of gas generated within the battery, as a solute constituting an electrolyte, at least one selected from the group consisting of $LiPF_6$, $LiBF_4$, $LiSbF_6$ and $LiAsF_6$ as well as at least one selected from the group consisting of $LiPF_a(C_bF_{2b+1})_{6-a}$, $LiPF_c(C_dF_{2d+1}SO_2)_{6-c}$, $LiBF_e(C_fF_{2f+1})_{4-e}$, $LiBF_g(C_hF_{2h+1}SO_2)_{4-g}$ are used.

4 Claims, 1 Drawing Sheet

NON-AQUEOUS ELECTROLYTE SECONDARY BATTERY

CROSS-REFERENCE TO RELATED APPLICATION

This application is a Section 371 of PCT/JP01/05338, filed Jun. 21, 2001, published in the Japanese language on Jan. 24, 2002 under WO 02/07248 A1, the disclosure of which is incorporated herein by reference.

TECHNICAL FIELD

The present invention relates to improvement of a non-aqueous electrolyte with the aim of suppressing deterioration in battery characteristics of a non-aqueous electrolyte secondary battery in operation at a high temperature or after storage at a high temperature as well as suppressing generation of gas within the battery.

BACKGROUND ART

As solutes constituting a non-aqueous electrolyte in a non-aqueous electrolyte secondary battery, $LiPF_6$, $LiClO_4$, $LiBF_4$, $LiAlCl_4$, $LiSbF_6$, $LiSCN$, $LiCl$, $LiAsF_6$, $LiCF_3SO_3$, $(CF_3SO_2)_2NLi$ and the like have been used singly or by mixture. In particular, $LiPF_6$ has typically been used as having favorable conductivity.

$LiPF_6$, however, has very low heat stability, and when a battery fabricated using a non-aqueous electrolyte containing $LiPF_6$ as a solute is stored in the charged state at a high temperature, $LiPF_6$ pyrolytically decomposes to produce hydrogen fluoride (HF), $PF_5$ or the like, exerting an adverse effect on the battery. As a result, problems may arise in a case of applying such a battery to appliances such as notebook computers with high calorific power that the batteries are exposed to a high temperature, leading to a sudden decline in battery performance and to generation of a large amount of gas within the battery.

Accordingly, the present invention is directed at solving such problems as thus described in a non-aqueous electrolyte secondary battery comprising a positive electrode, a negative electrode and a non-aqueous electrolyte, and provides an excellent non-aqueous electrolyte secondary battery, the deterioration in battery characteristics of which in operation at a high temperature and after storage at a high temperature is suppressed and within which gas is generated in a small amount.

DISCLOSURE OF INVENTION

The present invention relates a non-aqueous electrolyte secondary battery comprising a positive electrode, a negative electrode and a non-aqueous electrolyte obtained by dissolving a solute in a non-aqueous solvent, characterized in that the non-aqueous electrolyte contains: at least one selected from the group consisting of $LiPF_6$, $LiBF_4$, $LiSbF_6$ and $LiAsF_6$; and at least one selected from the group consisting of a compound represented by the formula (1): $LiPF_a(C_bF_{2b+1})_{6-a}$ where a is an integer of 1 to 5 and b is an integer not less than 1, a compound represented by the formula (2): $LiPF_c(C_dF_{2d+1}SO_2)_{6-c}$ where c is an integer of 1 to 5 and d is an integer not less than 1, a compound represented by the formula (3): $LiBF_e(C_fF_{2f+1})_{4-e}$ where e is an integer of 1 to 3 and f is an integer not less than 1, and a compound represented by the formula (4): $LiBF_g(C_hF_{2h+1}SO_2)_{4-g}$ where g is an integer of 1 to 3 and h is an integer not less than 1.

It is preferable that, as the solute, $LiPF_4(CF_3)_2$, $LiPF_4(C_2F_5)_2$, $LiPF_3(CF_3)_3$, $LiPF_3(C_2F_5)_3$, $LiPF_4(CF_3SO_2)_2$, $LiPF_4(C_2F_5SO_2)_2$, $LiPF_3(CF_3SO_2)_3$, $LiPF_3(C_2F_5SO_2)_3$, $LiBF_2(CF_3)_2$, $LiBF_2(C_2F_5)_2$, $LiBF_2(CF_3SO_2)_2$ or $LiBF_2(C_2F_5SO_2)_2$ is used.

It is also preferable that the negative electrode comprises a carbon material, the positive electrode comprises a lithium containing transition metal oxide, and the non-aqueous solvent comprises at least one selected from the group consisting of ethylene carbonate, propylene carbonate, butylene carbonate, ethyl methyl carbonate, diethyl carbonate, dimethyl carbonate, γ-butyrolactone, γ-valerolactone, α-acetyl-γ-butyrolactone, α-methyl-γ-butyrolactone, methyl acetate, ethyl acetate, methyl propionate, ethyl butylate, butyl acetate, n-propyl acetate, iso-butyl propionate and benzyl acetate.

It is further preferable that the non-aqueous electrolyte contains a carbonic acid ester type additive or a sulfur compound type additive.

BEST MODE FOR CARRYING OUT THE INVENTION

Figure 1:
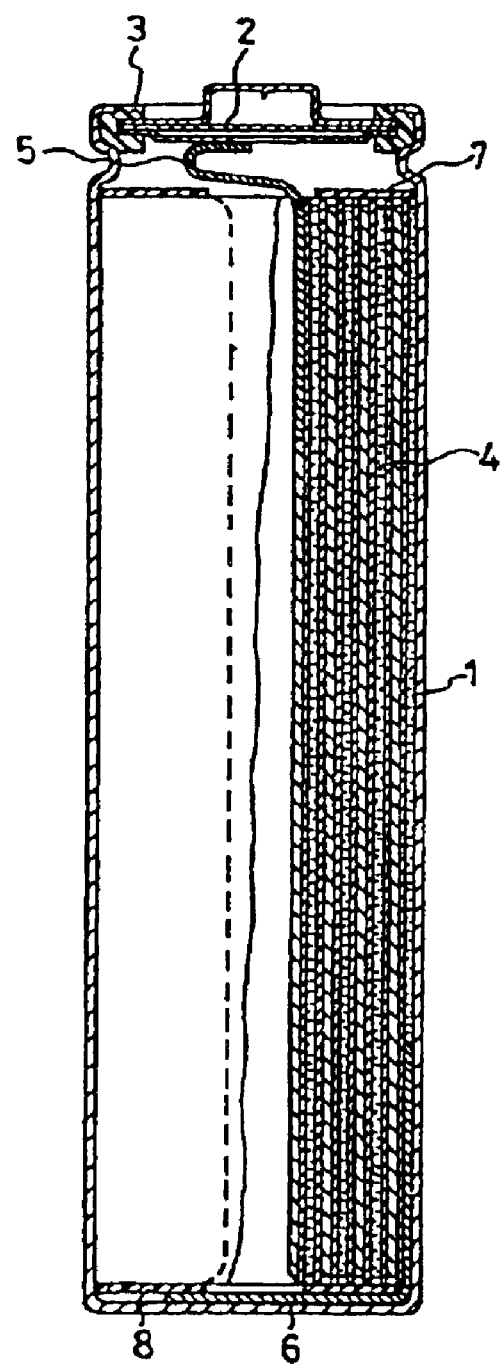
FIG. 1 is a front view, partially cross sectioned, of a cylindrical battery used in an example of the present invention.

A non-aqueous electrolyte for use in a non-aqueous electrolyte secondary battery of the present invention is constituted of a non-aqueous solvent and a solute to dissolve therein.

It is preferable that the solute to dissolve in the non-aqueous solvent which is used in the present invention contains at least one solute selected from the group consisting of $LiPF_6$, $LiBF_4$, $LiSbF_6$ and $LiAsF_6$, in addition to at least one selected from the group consisting of a compound represented by the formula (1): $LiPF_a(C_bF_{2b+1})_{6-a}$ where a is an integer of 1 to 5 and b is an integer not less than 1, a compound represented by the formula (2): $LiPF_c(C_dF_{2d+1}SO_2)_{6-c}$ where c is an integer of 1 to 5 and d is an integer not less than 1, a compound represented by the formula (3): $LiBF_e(C_fF_{2f+1})_{4-e}$ where e is an integer of 1 to 3 and f is an integer not less than 1, and a compound represented by the formula (4): $LiBF_g(C_hF_{2h+1}SO_2)_{4-g}$ where g is an integer of 1 to 3 and h is an integer not less than 1.

It is preferable that the compounds represented by the formulae (1) to (4) are at least ones selected from the group consisting of $LiPF_4(CF_3)_2$, $LiPF_4(C_2F_5)_2$, $LiPF_3(CF_3)_3$, $LiPF_3(C_2F_5)_3$, $LiPF_4(CF_3SO_2)_2$, $LiPF_4(C_2F_5SO_2)_2$, $LiPF_3(CF_3SO_2)_3$, $LiPF_3(C_2F_5SO_2)_3$, $LiBF_2(CF_3)_2$, $LiBF_2(C_2F_5)_2$, $LiBF_2(CF_3SO_2)_2$ and $LiBF_2(C_2F_5SO_2)_2$.

The mole ratio of the at least one solute selected from the group consisting of the compounds represented by the formulae (1) to (4) and the at least one solute selected from the group consisting of $LiPF_6$, $LiBF_4$, $LiSbF_6$ and $LiAsF_6$ is desirably in a range of 1:99 to 99:1.

Since the compounds represented by the formulae (1) to (4) are highly excellent in heat stability, battery characteristics of batteries using these compounds deteriorate little in operation at a high temperature and after storage at a high temperature, and gas is generated in small amounts in pyrolytical decomposition. There is, however, a problem that these compounds readily decompose on the positive electrode. In the present invention, consequently, at least one solute selected from the group consisting of $LiPF_6$, $LiBF_4$, $LiSbF_6$ and $LiAsF_6$ is further contained in the electrolyte.

These solutes react by priority on the positive electrode to form a high-quality film thereon, resulting in suppression of decomposition reactions of the compounds represented by the formulae (1) to (4) on the positive electrode.

As a component of the non-aqueous solvent preferably used is ethylene carbonate, propylene carbonate, ethyl methyl carbonate, diethyl carbonate, dimethyl carbonate, γ-butyrolactone, γ-valerolactone, α-acetyl-γ-butyrolactone, α-methyl-γ-butyrolactone, methyl acetate, ethyl acetate, methyl propionate, ethyl butylate, butyl acetate, n-propyl acetate, iso-butyl propionate, benzyl acetate or the like. These may be used singly or in combination of two or more of them. Among these components, ethylene carbonate, propylene carbonate, ethyl methyl carbonate and γ-butyrolactone are preferred. In terms of the gas generation, however, when aliphatic carboxylic acid ester is contained, the above solvent may be contained preferably in the range of not more than 30% by weight, more preferably not more than 20% by weight, per the total non-aqueous solvent.

As for the non-aqueous solvent for use in the present invention, for example, ones having the following compositions are preferred:

(i) A non-aqueous solvent consisting of 5 to 50% by volume of ethylene carbonate and 50 to 95% by volume of ethyl methyl carbonate (total 100% by volume).

(ii) A non-aqueous solvent consisting of 50 to 100% by volume of γ-butyrolactone and 0 to 50% by volume of propylene carbonate (total 100% by volume).

(iii) A non-aqueous solvent consisting of 50 to 100% by volume of propylene carbonate and 0 to 50% by volume of γ-butyrolactone (total 100% by volume).

However, when γ-butyrolactone or propylene carbonate is used as a main component, chain carbonic acid ester such as diethyl carbonate, dimethyl carbonate and ethyl methyl carbonate may be added for the purpose of decreasing viscosity of the non-aqueous solvent to be obtained, and cyclic carbonic acid ester such as ethylene carbonate may be added for the purpose of increasing a dielectric constant.

Addition of at least one selected from the group consisting of the carbonic acid ester type additive and the sulfur compound type additive to the non-aqueous electrolyte is preferred from the perspective of further improvement in effect of suppressing the gas generation. It is considered that the carbonic acid ester type additive has the effect of reducing the amount of gas such as $H_2$ and $CH_4$ generated on the surface of the negative electrode by formation of a film or the like whereas the sulfur compound type additive has the effect of reducing the amount of gas such as $CO_2$ generated on the surface of the positive electrode by formation of a film or the like.

The carbonic acid ester type additive may be exemplified by vinylene carbonate, phenylethylene carbonate, phenylvinylene carbonate, diphenylvinylene carbonate, trifluoropropylene carbonate, chloroethylene carbonate, methoxypropylene carbonate, vinylethylene carbonate, catechol carbonate, tetrahydrofuran carbonate, diphenyl carbonate and diethyl dicarbonate (diethyl dicarbonate). These may be used singly or in combination of two or more of them. Among them, vinylene carbonate, phenylvinylene carbonate and the like, especially vinylene carbonate, are preferable in the sense that they are highly effective in reducing the amount of gas generated on the surface of the negative electrode.

The sulfur compound type additive may be exemplified by ethylene sulphite, ethylene trithiocarbonate, vinylene trithiocarbonate, catechol sulphite, tetrahydrofuran sulphite, sulfolane, 3-methyl sulfolane, sulfolene, propanesultone and 1,4-butane sultone. These may be used singly or in combination of two or more of them. Among them, propanesultone, sulfolane, ethylene sulphite, catechol sulphite and the like, especially propanesultone, are preferable in the sense that they are highly effective in reducing the amount of gas generated on the surface of the positive electrode.

At least one selected from the group consisting of the carbonic acid ester type additive and the sulfur compound type additive is added preferably in an amount of 0.1 to 10 parts by weight, more preferably 0.5 to 5 parts by weight, with respect to 100 parts by weight of the non-aqueous electrolyte. When the amount of these additives added is below 0.1 part by weight, there is little improvement in effect of suppressing the gas generation; when the amount added is over 10 parts by weight, a film formed on the electrode becomes excessively thick, causing the discharge characteristic to deteriorate.

In a case where the carbonic acid ester type additive is used together with the sulfur compound type additive, the preferable added ratio of the two additives (the carbonic acid ester type additive: the sulfur compound type additive) is 1:9 to 9:1 in point of well-balanced obtainment of the two effects.

The carbonic acid ester type additive is added preferably in an amount of 0.1 to 10 parts by weight, and more preferably 0.5 to 5 parts by weight, with respect to 100 parts by weight of the non-aqueous electrolyte. When the amount added is below 0.1 part by weight, there is little improvement in effect of suppressing the amount of gas generated at the negative electrode; when the amount added is over 10 parts by weight, a film formed on the electrode becomes excessively thick, causing the discharge characteristic to deteriorate.

The sulfur compound type additive is added preferably in an amount of 0.1 to 10 parts by weight, and more preferably 0.5 to 5 parts by weight, with respect to 100 parts by weight of the non-aqueous electrolyte. When the amount added is below 0.1 part by weight, there is little improvement in effect of suppressing the amount of gas generated at the positive electrode; when the amount added is over 10 parts by weight, a film formed on the electrode becomes excessively thick, causing the discharge characteristic to deteriorate.

A partially cross-sectioned front view of a cylindrical battery fabricated in the following examples is shown herein. The cylindrical battery shown in FIG. 1 comprises a battery case 1 obtained by processing a stainless steel plate corrosive-resistant to an electrolyte, a sealing member 2 having a safety valve formed therein and an insulating packing 3. An electrode plate assembly 4, being accommodated in the battery case 1, is obtained by rolling up a positive electrode plate and a negative electrode plate with a separator interposed therebetween. A positive electrode lead 5 attached to the positive electrode plate is connected to the sealing plate 2; a negative electrode lead 6 attached to the negative electrode plate is connected to the bottom of the battery case 1. Further, an upper insulating ring 7 and a lower insulating ring 8 are provided on the upper and lower parts of the electrode plate assembly 4, respectively.

EXAMPLE (1) Production of Positive Electrode Plate 3 parts by weight of acetylene black and 7 parts by weight of a fluorocarbon resin as a binder were blended into 100 parts by weight of a $LiCoO_2$ powder, and the obtained mixture was suspended in an aqueous solution of carboxymethyl cellulose to obtain a positive electrode mixture paste.

The positive electrode mixture paste was applied onto an aluminum foil having a thickness of 30 μm, followed by drying and pressing to obtain a positive electrode plate with a thickness of 0.18 mm, a width of 37 mm and a length of 390 mm.

(2) Production of Negative Electrode Plate

One (mesophase graphite) obtained by graphitizing a mesophase sphere at a high temperature of 2,800° C. was used. 5 parts by weight of styrene-butadiene rubber was blended into 100 parts by weight of the mesophase graphite, and the obtained mixture was suspended in an aqueous solution of carboxymethyl cellulose to obtain a negative electrode mixture paste. The negative electrode mixture paste was applied onto each face of a copper foil having a thickness of 20 μm, followed by drying and pressing to obtain a negative electrode plate having a thickness of 0.20 mm, a width of 39 mm and a length of 420 mm.

A positive electrode lead 5 made of aluminum and a negative electrode lead 6 made of nickel were attached to the positive electrode plate and the negative electrode, respectively. These electrode plates were then rolled up via a separator made of a polypropylene having a thickness of 25 μm, a width of 45 mm and a length of 950 mm to obtain an electrode plate 4. This was accommodated in a battery case having a diameter of 17.0 mm and a height of 50.0 mm, and a non-aqueous electrolyte prepared as described below was poured into the battery case, to complete a battery.

Example 1

Using a non-aqueous electrolyte obtained by dissolving $LiPF_6$ and $LiPF_4(CF_3)_2$ as solutes each at the rate of 0.5 M(mol/liter) in a mixed solvent of ethylene carbonate (EC) and ethyl methyl carbonate (EMC) in a mixed volume ratio of 1:3, a battery 1 of the present invention, mode of which is shown in FIG. 1, was fabricated.

Examples 2 to 12

Batteries 2 to 12 of the present invention were fabricated in the same manner as in Example 1 except that $LiPF_4(C_2F_5)_2$, $LiPF_3(CF_3)_3$, $LiPF_3(C_2F_5)_3$, $LiPF_4(CF_3SO_2)_2$, $LiPF_4(C_2F_5SO_2)_2$, $LiPF_3(CF_3SO_2)_3$, $LiPF_3(C_2F_5SO_2)_3$, $LiBF_2(CF_3)_2$, $LiBF_2(C_2F_5)_2$, $LiBF_2(CF_3SO_2)_2$ or $LiBF_2(C_2F_5SO_2)_2$ was used in place of $LiPF_4(CF_3)_2$.

Examples 13 to 24

Batteries 13 to 24 of the present invention were fabricated in the same manner as in Example 1 and Examples 2 to 12 except that $LiBF_4$ was used in place of $LiPF_6$.

Example 25

A battery 25 of the present invention was fabricated in the same manner as in Example 1 except that γ-butyrolactone (GBL) was used in place of EMC.

Example 26

A battery 26 of the present invention was fabricated in the same manner as in Example 1 except that 2.0 parts by weight of vinylene carbonate (VC) was further added to the non-aqueous electrolyte.

Example 27

A battery 27 of the present invention was fabricated in the same manner as in Example 1 except that 4.0 parts by weight of propanesultone (PS) was further added to the non-aqueous electrolyte.

Example 28

A battery 28 of the present invention was fabricated in the same manner as in Example 1 except that 2.0 parts by weight of VC and 4.0 parts by weight of PS were further added to the non-aqueous electrolyte.

Comparative Example 1

A comparative battery 1 was fabricated in the same manner as in Example 1 except that $LiPF_4(CF_3)_2$ was not added and $LiPF_6$ was added in an amount of 1.0 M(mol/liter).

Comparative Examples 2 to 13

Comparative batteries 2 to 13 were fabricated in the same manner as in Example 1 except that, to the electrolyte, $LiPF_6$ was not added and $LiPF_4(CF_3)_2$, $LiPF_4(C_2F_5)_2$, $LiPF_3(CF_3)_3$, $LiPF_3(C_2F_5)_3$, $LiPF_4(CF_3SO_2)_2$, $LiPF_4(C_2F_5SO_2)_2$, $LiPF_3(CF_3SO_2)_3$, $LiPF_3(C_2F_5SO_2)_3$, $LiBF_2(CF_3)_2$, $LiBF_2(C_2F_5)_2$, $LiBF_2(CF_3SO_2)_2$ or $LiBF_2(C_2F_5SO_2)_2$ was added in an amount of 1.0 M(mol/liter).

Comparative Example 14

A comparative battery 14 was fabricated in the same manner as in Comparative Example 1 except that GBL was used in place of EMC.

Comparative Example 15

A comparative battery 15 was fabricated in the same manner as in Comparative Example 2 except that GBL was used in place of EMC.

[Evaluation]

Five articles each of the batteries 1 to 28 of the present invention and the comparative batteries 1 to 15 were prepared. Under conditions of an environmental temperature of 20° C., a charging voltage of 4.2 V, charging time of 2 hours and a controlled current of 500 mA, constant voltage charging was conducted to investigate discharge characteristics of the batteries in the discharged state at 1 A. Subsequently, the batteries were stored in the charged state at 80° C. for 5 days, which were again charged and discharged under the same condition as above, to determine a recover ratio of discharge capacity (discharge capacity after storage/discharge capacity before storage ×100 (%)) (shown in Tables 1 and 2). The amounts of gas generated in the batteries after the storage test were also measured. (shown in Tables 3 and 4).

TABLE 1

| Battery | Composition of non-aqueous solvent | Composition of solute (Composition of additive) | Recover ratio of discharge capacity after storage (%) |
|---|---|---|---|
| Battery 1 | EC/EMC (1/3) | 0.5 M $LiPF_6$ 0.5 M $LiPF_4(CF_3)_2$ | 92.4 |
| Battery 2 | EC/EMC (1/3) | 0.5 M $LiPF_6$ 0.5 M $LiPF_4(C_2F_5)_2$ | 92.7 |
| Battery 3 | EC/EMC (1/3) | 0.5 M $LiPF_6$ 0.5 M $LiPF_3(CF_3)_3$ | 92.1 |
| Battery 4 | EC/EMC (1/3) | 0.5 M $LiPF_6$ 0.5 M $LiPF_3(C_2F_5)_3$ | 91.3 |
| Battery 5 | EC/EMC (1/3) | 0.5 M $LiPF_6$ 0.5 M $LiPF_4(CF_3SO_2)_2$ | 89.6 |
| Battery 6 | EC/EMC (1/3) | 0.5 M $LiPF_6$ 0.5 M $LiPF_4(C_2F_5SO_2)_2$ | 90.5 |
| Battery 7 | EC/EMC (1/3) | 0.5 M $LiPF_6$ 0.5 M $LiPF_3(CF_3SO_2)_3$ | 91.0 |

TABLE 1-continued

| Battery | Composition of non-aqueous solvent | Composition of solute (Composition of additive) | Recover ratio of discharge capacity after storage (%) |
|---|---|---|---|
| Battery 8 | EC/EMC (1/3) | 0.5 M LiPF$_6$ 0.5 M LiPF$_3$(C$_2$F$_5$SO$_2$)$_3$ | 89.4 |
| Battery 9 | EC/EMC (1/3) | 0.5 M LiPF$_6$ 0.5 M LiBF$_2$(CF$_3$)$_2$ | 90.7 |
| Battery 10 | EC/EMC (1/3) | 0.5 M LiPF$_6$ 0.5 M LiBF$_2$(C$_2$F$_5$)$_2$ | 91.8 |
| Battery 11 | EC/EMC (1/3) | 0.5 M LiPF$_6$ 0.5 M LiBF$_2$(CF$_3$SO$_2$)$_2$ | 91.1 |
| Battery 12 | EC/EMC (1/3) | 0.5 M LiPF$_6$ 0.5 M LiBF$_2$(C$_2$F$_5$SO$_2$)$_2$ | 89.9 |
| Battery 13 | EC/EMC (1/3) | 0.5 M LiBF$_4$ 0.5 M LiPF$_4$(CF$_3$)$_2$ | 93.5 |
| Battery 14 | EC/EMC (1/3) | 0.5 M LiBF$_4$ 0.5 M LiPF$_4$(C$_2$F$_5$)$_2$ | 92.0 |
| Battery 15 | EC/EMC (1/3) | 0.5 M LiBF$_4$ 0.5 M LiPF$_3$(CF$_3$)$_3$ | 90.1 |
| Battery 16 | EC/EMC (1/3) | 0.5 M LiBF$_4$ 0.5 M LiPF$_3$(C$_2$F$_5$)$_3$ | 92.3 |
| Battery 17 | EC/EMC (1/3) | 0.5 M LiBF$_4$ 0.5 M LiPF$_4$(CF$_3$SO$_2$)$_2$ | 89.2 |
| Battery 18 | EC/EMC (1/3) | 0.5 M LiBF$_4$ 0.5 M LiPF$_4$(C$_2$F$_5$SO$_2$)$_2$ | 91.1 |
| Battery 19 | EC/EMC (1/3) | 0.5 M LiBF$_4$ 0.5 M LiPF$_3$(CF$_3$SO$_2$)$_3$ | 93.0 |
| Battery 20 | EC/EMC (1/3) | 0.5 M LiBF$_4$ 0.5 M LiPF$_3$(C$_2$F$_5$SO$_2$)$_3$ | 92.6 |
| Battery 21 | EC/EMC (1/3) | 0.5 M LiBF$_4$ 0.5 M LiBF$_2$(CF$_3$)$_2$ | 89.6 |
| Battery 22 | EC/EMC (1/3) | 0.5 M LiBF$_4$ 0.5 M LiBF$_2$(C$_2$F$_5$)$_2$ | 89.5 |

TABLE 2

| Battery | Composition of non-aqueous solvent | Composition of solute (Composition of additive) | Recover ratio of discharge capacity after storage (%) |
|---|---|---|---|
| Battery 23 | EC/EMC (1/3) | 0.5 M LiBF$_4$ 0.5 M LiBF$_2$(CF$_3$SO$_2$)$_2$ | 90.4 |
| Battery 24 | EC/EMC (1/3) | 0.5 M LiBF$_4$ 0.5 M LiBF$_2$(C$_2$F$_5$SO$_2$)$_2$ | 92.4 |
| Battery 25 | EC/GBL (1/3) | 0.5 M LiPF$_6$ 0.5 M LiPF$_4$(CF$_3$)$_2$ | 90.2 |
| Battery 26 | EC/EMC (1/3) | 0.5 M LiPF$_6$ 0.5 M LiPF$_4$(CF$_3$)$_2$ (2.0 part by weight VC) | 95.3 |
| Battery 27 | EC/EMC (1/3) | 0.5 M LiPF$_6$ 0.5 M LiPF$_4$(CF$_3$)$_2$ (4.0 part by weight PS) | 94.4 |
| Battery 28 | EC/EMC (1/3) | 0.5 M LiPF$_6$ 0.5 M LiPF$_4$(CF$_3$)$_2$ (2.0 part by weight VC) (4.0 part by weight PS) | 95.5 |
| Comparative Battery 1 | EC/EMC (1/3) | 1.0 M LiPF$_6$ | 70.3 |
| Comparative Battery 2 | EC/EMC (1/3) | 1.0 M LiPF$_4$(CF$_3$)$_2$ | 65.3 |
| Comparative Battery 3 | EC/EMC (1/3) | 1.0 M LiPF$_4$(C$_2$F$_5$)$_2$ | 62.7 |
| Comparative Battery 4 | EC/EMC (1/3) | 1.0 M LiPF$_3$(CF$_3$)$_3$ | 59.8 |
| Comparative Battery 5 | EC/EMC (1/3) | 1.0 M LiPF$_3$(C$_2$F$_5$)$_3$ | 63.1 |
| Comparative Battery 6 | EC/EMC (1/3) | 1.0 M LiPF$_4$(CF$_3$SO$_2$)$_2$ | 61.0 |
| Comparative Battery 7 | EC/EMC (1/3) | 1.0 M LiPF$_4$(C$_2$F$_5$SO$_2$)$_2$ | 60.0 |
| Comparative Battery 8 | EC/EMC (1/3) | 1.0 M LiPF$_3$(CF$_3$SO$_2$)$_3$ | 60.4 |
| Comparative Battery 9 | EC/EMC (1/3) | 1.0 M LiPF$_3$(C$_2$F$_5$SO$_2$)$_3$ | 64.4 |
| Comparative Battery 10 | EC/EMC (1/3) | 1.0 M LiBF$_2$(CF$_3$)$_2$ | 63.9 |
| Comparative Battery 11 | EC/EMC (1/3) | 1.0 M LiBF$_2$(C$_2$F$_5$)$_2$ | 59.3 |
| Comparative Battery 12 | EC/EMC (1/3) | 1.0 M LiBF$_2$(CF$_3$SO$_2$)$_2$ | 65.4 |
| Comparative Battery 13 | EC/EMC (1/3) | 1.0 M LiBF$_2$(C$_2$F$_5$SO$_2$)$_2$ | 62.0 |
| Comparative Battery 14 | EC/GBL (1/3) | 1.0 M LiPF$_6$ | 69.0 |
| Comparative Battery 15 | EC/GBL (1/3) | 1.0 M LiPF$_4$(CF$_3$)$_2$ | 65.0 |

TABLE 3

| Battery | Composition of non-aqueous solvent | Composition of solute (Composition of additive) | Amount of gas generation after storage |
|---|---|---|---|
| Battery 1 | EC/EMC (1/3) | 0.5 M LiPF$_6$ 0.5 M LiPF$_4$(CF$_3$)$_2$ | 1.1 |
| Battery 2 | EC/EMC (1/3) | 0.5 M LiPF$_6$ 0.5 M LiPF$_4$(C$_2$F$_5$)$_2$ | 1.3 |
| Battery 3 | EC/EMC (1/3) | 0.5 M LiPF$_6$ 0.5 M LiPF$_3$(CF$_3$)$_3$ | 1.1 |
| Battery 4 | EC/EMC (1/3) | 0.5 M LiPF$_6$ 0.5 M LiPF$_3$(C$_2$F$_5$)$_3$ | 1.4 |
| Battery 5 | EC/EMC (1/3) | 0.5 M LiPF$_6$ 0.5 M LiPF$_4$(CF$_3$SO$_2$)$_2$ | 0.9 |
| Battery 6 | EC/EMC (1/3) | 0.5 M LiPF$_6$ 0.5 M LiPF$_4$(C$_2$F$_5$SO$_2$)$_2$ | 1.0 |
| Battery 7 | EC/EMC (1/3) | 0.5 M LiPF$_6$ 0.5 M LiPF$_3$(CF$_3$SO$_2$)$_3$ | 1.2 |
| Battery 8 | EC/EMC (1/3) | 0.5 M LiPF$_6$ 0.5 M LiPF$_3$(C$_2$F$_5$SO$_2$)$_3$ | 1.2 |
| Battery 9 | EC/EMC (1/3) | 0.5 M LiPF$_6$ 0.5 M LiBF$_2$(CF$_3$)$_2$ | 1.3 |
| Battery 10 | EC/EMC (1/3) | 0.5 M LiPF$_6$ 0.5 M LiBF$_2$(C$_2$F$_5$)$_2$ | 0.9 |
| Battery 11 | EC/EMC (1/3) | 0.5 M LiPF$_6$ 0.5 M LiBF$_2$(CF$_3$SO$_2$)$_2$ | 1.1 |
| Battery 12 | EC/EMC (1/3) | 0.5 M LiPF$_6$ 0.5 M LiBF$_2$(C$_2$F$_5$SO$_2$)$_2$ | 1.1 |
| Battery 13 | EC/EMC (1/3) | 0.5 M LiBF$_4$ 0.5 M LiBF$_4$(CF$_3$)$_2$ | 1.2 |
| Battery 14 | EC/EMC (1/3) | 0.5 M LiBF$_4$ 0.5 M LiPF$_4$(C$_2$F$_5$)$_2$ | 1.3 |
| Battery 15 | EC/EMC (1/3) | 0.5 M LiBF$_4$ 0.5 M LiPF$_3$(CF$_3$)$_3$ | 1.0 |
| Battery 16 | EC/EMC (1/3) | 0.5 M LiBF$_4$ 0.5 M LiPF$_3$(C$_2$F$_5$)$_3$ | 1.1 |
| Battery 17 | EC/EMC (1/3) | 0.5 M LiBF$_4$ 0.5 M LiPF$_4$(CF$_3$SO$_2$)$_2$ | 1.0 |
| Battery 18 | EC/EMC (1/3) | 0.5 M LiBF$_4$ 0.5 M LiPF$_4$(C$_2$F$_5$SO$_2$)$_2$ | 1.2 |
| Battery 19 | EC/EMC (1/3) | 0.5 M LiBF$_4$ 0.5 M LiPF$_3$(CF$_3$SO$_2$)$_3$ | 1.3 |
| Battery 20 | EC/EMC (1/3) | 0.5 M LiBF$_4$ 0.5 M LiPF$_3$(C$_2$F$_5$SO$_2$)$_3$ | 1.1 |
| Battery 21 | EC/EMC (1/3) | 0.5 M LiBF$_4$ 0.5 M LiBF$_2$(CF$_3$)$_2$ | 1.0 |
| Battery 22 | EC/EMC (1/3) | 0.5 M LiBF$_4$ 0.5 M LiBF$_2$(C$_2$F$_5$)$_2$ | 1.0 |

TABLE 4

| Battery | Composition of non-aqueous solvent | Composition of solute (Composition of additive) | Amount of gas generation after storage |
|---|---|---|---|
| Battery 23 | EC/EMC (1/3) | 0.5 M $LiBF_4$<br>0.5 M $LiBF_2(CF_3SO_2)_2$ | 1.1 |
| Battery 24 | EC/EMC (1/3) | 0.5 M $LiBF_4$<br>0.5 M $LiBF_2(C_2F_5SO_2)_2$ | 1.2 |
| Battery 25 | EC/GBL (1/3) | 0.5 M $LiPF_6$<br>0.5 M $LiPF_4(CF_3)_2$ | 1.2 |
| Battery 26 | EC/EMC (1/3) | 0.5 M $LiPF_6$<br>0.5 M $LiPF_4(CF_3)_2$<br>(2.0 part by weight VC) | 0.6 |
| Battery 27 | EC/EMC (1/3) | 0.5 M $LiPF_6$<br>0.5 M $LiPF_4(CF_3)_2$<br>(4.0 part by weight PS) | 0.7 |
| Battery 28 | EC/EMC (1/3) | 0.5 M $LiPF_6$<br>0.5 M $LiPF_4(CF_3)_2$<br>(2.0 part by weight VC)<br>(4.0 part by weight PS) | 0.5 |
| Comparative Battery 1 | EC/EMC (1/3) | 1.0 M $LiPF_6$ | 2.3 |
| Comparative Battery 2 | EC/EMC (1/3) | 1.0 M $LiPF_4(CF_3)_2$ | 2.0 |
| Comparative Battery 3 | EC/EMC (1/3) | 1.0 M $LiPF_4(C_2F_5)_2$ | 2.1 |
| Comparative Battery 4 | EC/EMC (1/3) | 1.0 M $LiPF_3(CF_3)_3$ | 2.2 |
| Comparative Battery 5 | EC/EMC (1/3) | 1.0 M $LiPF_3(C_2F_5)_3$ | 2.4 |
| Comparative Battery 6 | EC/EMC (1/3) | 1.0 M $LiPF_4(CF_3SO_2)_2$ | 1.9 |
| Comparative Battery 7 | EC/EMC (1/3) | 1.0 M $LiPF_4(C_2F_5SO_2)_2$ | 2.0 |
| Comparative Battery 8 | EC/EMC (1/3) | 1.0 M $LiPF_3(CF_3SO_2)_3$ | 2.2 |
| Comparative Battery 9 | EC/EMC (1/3) | 1.0 M $LiPF_3(C_2F_5SO_2)_3$ | 2.1 |
| Comparative Battery 10 | EC/EMC (1/3) | 1.0 M $LiBF_2(CF_3)_2$ | 2.3 |
| Comparative Battery 11 | EC/EMC (1/3) | 1.0 M $LiBF_2(C_2F_5)_2$ | 2.3 |
| Comparative Battery 12 | EC/EMC (1/3) | 1.0 M $LiBF_2(CF_3SO_2)_2$ | 2.0 |
| Comparative Battery 13 | EC/EMC (1/3) | 1.0 M $LiBF_2(C_2F_5SO_2)_2$ | 1.9 |
| Comparative Battery 14 | EC/GBL (1/3) | 1.0 M $LiPF_6$ | 2.3 |
| Comparative Battery 15 | EC/GBL (1/3) | 1.0 M $LiPF_4(CF_3)_2$ | 2.4 |

As is obvious from these tables, the batteries 1 to 28 of the present invention are highly favorable in the recover ratios of discharge capacity, compared with the comparative battery 1 using only $LiPF_6$ as the solute and the comparative batteries 2 to 13 using only at least one solute selected from the group consisting of the aforesaid compounds, and the amounts of the gas generation in the batteries 1 to 28 of the present invention were reduced.

The batteries 26 to 28 of the present invention, with the additives used together, particularly exhibited such results as the recover ratios of discharge capacity were further favorable and small amounts of gas were generated. It was understood, accordingly, that addition of at least one solute selected from the group consisting of the aforesaid compounds with high heat stability to the non-aqueous electrolyte, and further addition of at least one solute selected from the group consisting of $LiPF_6$, $LiBF_4$, $LiSbF_6$ and $LiAsF_6$ to the positive electrode can result in obtainment of significant effect. It was also acknowledged that the simultaneous use of the additive further leads to obtainment of favorable results.

Moreover, the battery 25 of the present invention using GBL in place of EMC exhibited a favorable result compared with the comparative battery 14 using only $LiPF_6$ as the solute and the comparative battery 15 using only $LiPF_4(CF_3)_2$ as the solute, whereby it was acknowledged that a similar effect was obtained in the case of using GBL as the non-aqueous solvent to the case of using EMC.

INDUSTRIAL APPLICABILITY

According to the present invention, there is obtained an excellent non-aqueous electrolyte secondary battery, the deterioration in battery characteristics of which in operation at a high temperature and after storage at a high temperature is suppressed and within which gas is generated in a small amount.

What is claimed is:

1. A non-aqueous electrolyte secondary battery comprising a positive electrode, a negative electrode and a non-aqueous electrolyte obtained by dissolving a solute in a non-aqueous solvent, wherein said non-aqueous electrolyte contains:

at least one selected from the group consisting of $LiPF_6$, $LiBF_4$, $LiSbF_6$ and $LiAsF_6$; and at least one selected from the group consisting of, a compound represented by the formula(2): $LiPF_c(C_dF_{2d+1}SO_2)_{6-c}$ where c is an integer of 1 to 5 and d is an integer not less than 1; a compound represented by the formula(3): $LiBF_e(C_1F_{2f+1})_{4-e}$ where e is an integer of 1 to 3 and f is an integer not less than 1; and a compound represented by the formula(4): $LiBF_g(C_hF_{2h+1}SO_2)_{4-g}$ where g is an integer of 1 to 3 and h is an integer not less than 1.

2. The non-aqueous electrolyte secondary battery in accordance with claim 1, wherein said compound is $LiPF_4(CF_3SO_2)_2$, $LiPF_4(C_2F_5SO_2)_2$, $LiPF_3(CF_3SO_2)_3$, $LiPF_3(C_2F_5SO_2)_3$, $LiBF_2(CF_3)_2$, $LiBF_2(C_2F_5)_2$, $LiBF_2(CF_3SO_2)_2$ or $LiBF_2(C_2F_5SO_2)_2$.

3. The non-aqueous electrolyte secondary battery in accordance with claim 1, wherein said negative electrode comprises a carbon material, said positive electrode comprises a lithium containing transition metal oxide, and said non-aqueous solvent comprises at least one selected from the group consisting of ethylene carbonate, propylene carbonate, butylene carbonate, ethyl methyl carbonate, diethyl carbonate, dimethyl carbonate, γ-butyrolactone, γ-valerolactone, α-acetyl-γ-butyrolactone, α-methyl-γbutyrolactone, methyl acetate, ethyl acetate, methyl propionate, ethyl butylate, butyl acetate, n-propyl acetate, iso-butyl propionate and benzyl acetate.

4. The non-aqueous electrolyte secondary battery in accordance with claim 1, wherein said non-aqueous electrolyte contains a carbonic acid ester additive or a sulfur compound additive.

* * * * *

UNITED STATES PATENT AND TRADEMARK OFFICE
CERTIFICATE OF CORRECTION

| | |
|---|---|
| PATENT NO. | : 6,864,016 B2 |
| DATED | : March 8, 2005 |
| INVENTOR(S) | : Atsushi Ueda et al. |

It is certified that error appears in the above-identified patent and that said Letters Patent is hereby corrected as shown below:

<u>Title page,</u>
Item [56], References Cited, FOREIGN PATENT DOCUMENTS, the reference "2001-133304" should read -- 2000-133304 --.

Signed and Sealed this

Second Day of August, 2005

JON W. DUDAS
*Director of the United States Patent and Trademark Office*